(12) United States Patent
Boyapalle et al.

(10) Patent No.: US 9,792,168 B2
(45) Date of Patent: Oct. 17, 2017

(54) SYSTEM AND METHOD FOR CLOUD REMEDIATION OF A CLIENT WITH A NON-BOOTABLE STORAGE MEDIUM

(71) Applicant: Dell Products, LP, Round Rock, TX (US)

(72) Inventors: Anantha Boyapalle, Austin, TX (US); Yuan-Chang Lo, Austin, TX (US); Todd E. Swierk, Austin, TX (US); Carlton A. Andrews, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 141 days.

(21) Appl. No.: 14/687,357

(22) Filed: Apr. 15, 2015

(65) Prior Publication Data

US 2016/0306688 A1   Oct. 20, 2016

(51) Int. Cl.
G06F 11/00 (2006.01)
G06F 11/07 (2006.01)
G06F 11/22 (2006.01)

(52) U.S. Cl.
CPC ........ *G06F 11/079* (2013.01); *G06F 11/0748* (2013.01); *G06F 11/0793* (2013.01); *G06F 11/22* (2013.01)

(58) Field of Classification Search
USPC .................................................... 714/25, 36
See application file for complete search history.

(56) References Cited

U.S. PATENT DOCUMENTS

| | | | |
|---|---|---|---|
| 6,862,609 B2 | 3/2005 | Merkey | |
| 2003/0041211 A1 | 2/2003 | Merkey et al. | |
| 2003/0078103 A1* | 4/2003 | LeMay | A63F 13/12 463/43 |
| 2005/0235007 A1* | 10/2005 | Abali | G06F 11/0712 |
| 2008/0109648 A1* | 5/2008 | Weiberle | G06F 11/1417 713/2 |
| 2015/0254126 A1* | 9/2015 | Wood | G06F 17/30 714/53 |
| 2015/0309901 A1* | 10/2015 | Pershin | G06F 3/06 714/6.3 |
| 2016/0127200 A1* | 5/2016 | Dippenaar | H04L 41/5051 709/224 |

* cited by examiner

*Primary Examiner* — Sarai Butler
(74) *Attorney, Agent, or Firm* — Larson Newman, LLP (57) ABSTRACT

A remediation server receives a service request from a data processing device, the service request to diagnose a failure to load an operating system at the data processing device. A data storage device local to data processing device is identified, the data storage device storing the operating system. A diagnostic process is provided at the remediation server, the diagnostic process to mount the data storage device. A diagnostic service is performed based on information stored at the data storage device.

15 Claims, 5 Drawing Sheets

SYSTEM AND METHOD FOR CLOUD REMEDIATION OF A CLIENT WITH A NON-BOOTABLE STORAGE MEDIUM

FIELD OF THE DISCLOSURE

This disclosure relates generally to information handling systems, and more particularly relates to cloud remediation of a client information handling system with a non-bootable hard drive.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-5 illustrate techniques for diagnosing and/or remedying boot failures at an information handling system. In particular, firmware at an information handling system is configured to monitor processes responsible for initializing execution of an operating system (OS), such as a Windows operating system, a LINUX operating system, and the like. The OS is typically located on a storage device, such as a hard disk drive, a solid state drive, or another type of data storage device. A failure to initialize the OS can be referred to as a boot failure. A boot failure can result from a corruption of a master boot record (MBR) or GUID partitioning table (GPT), misconfiguration of an extensible firmware interface (EFI) boot partition, corrupt Windows registry keys and values, malicious software, and the like. As disclosed herein, the firmware can detect a boot failure, determine that the memory device storing the OS is accessible, and solicit assistance of a remedial service resource located remotely from the information handling system. For example, the firmware can communicate with a remediation server using an Internet protocol. The remediation server can remotely mount the data storage device containing the OS, and perform diagnostic test to determine the reason for the boot failure. If the remediation server identifies the cause of the failure, corrective actions can be administered.

Figure 1:
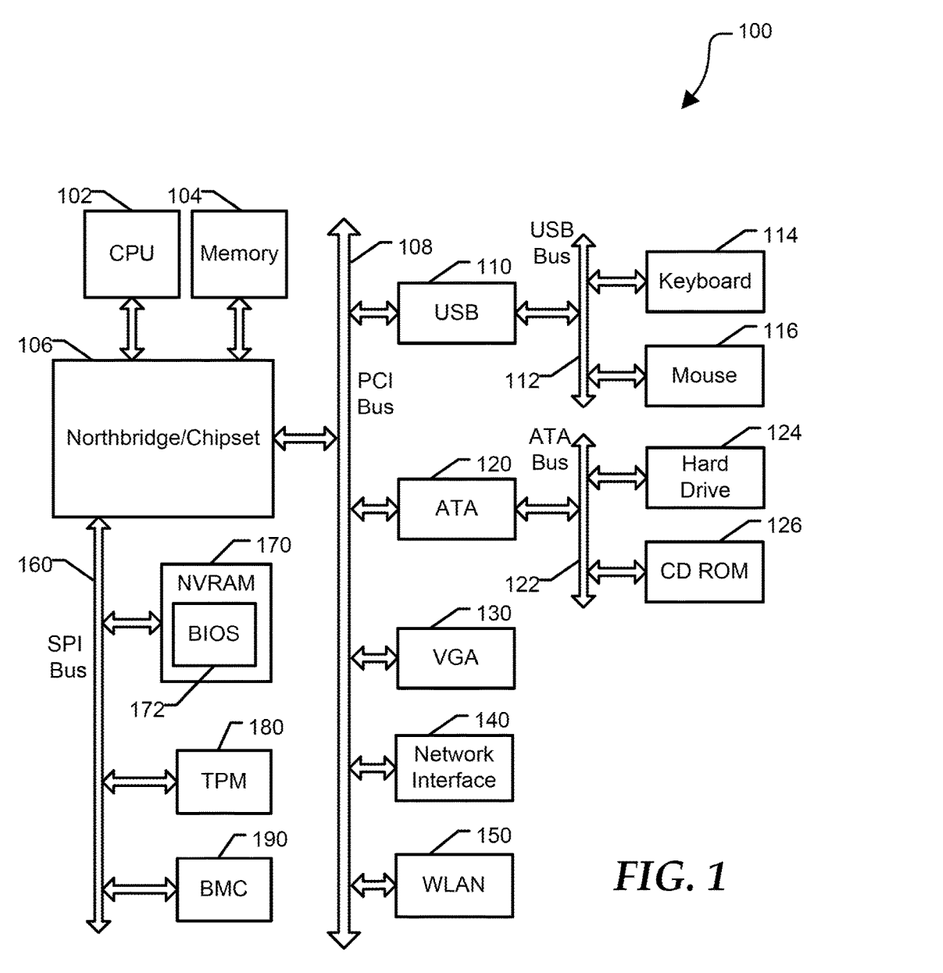
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random access memory (NVRAM) 170 for storing a basic input/output system (BIOS) 172, a trusted platform module (TPM) 180, and a baseboard management controller (BMC) 190. Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with devices, such as a keyboard, a display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having firmware.

Figure 2:
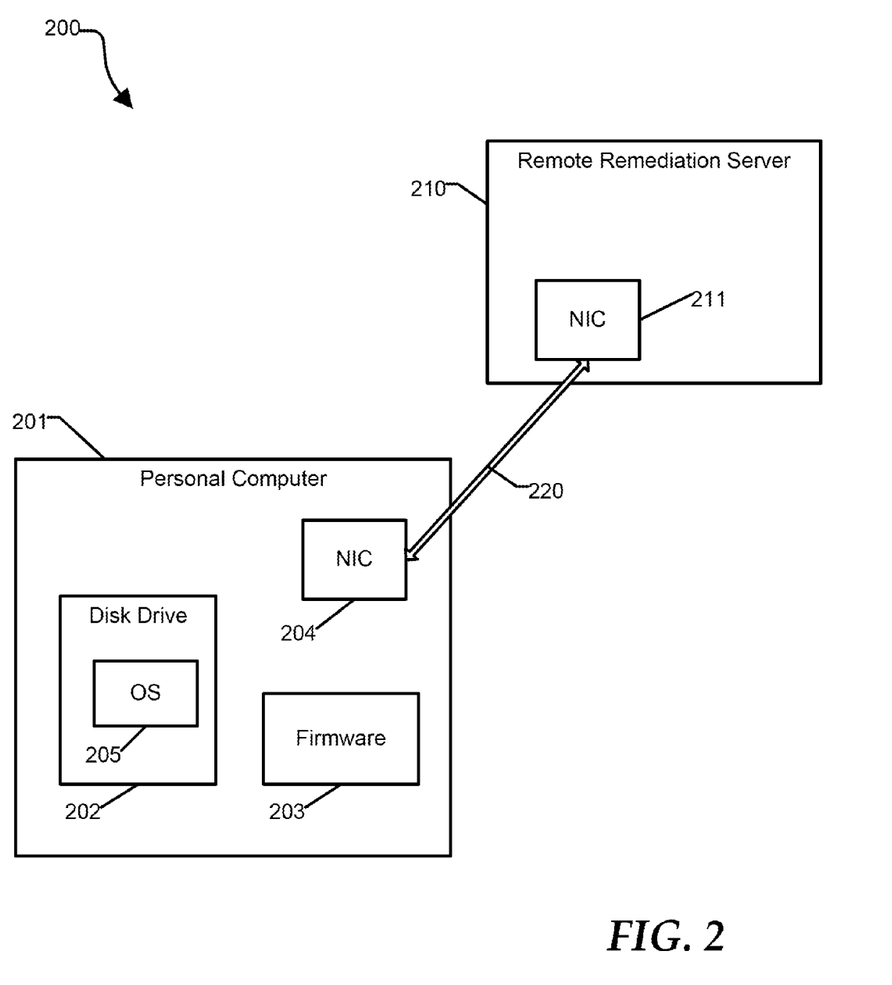
FIG. 2 is a block diagram of an information handling system for providing diagnostics and remediation according to another embodiment of the present disclosure.

FIG. 2 is a block diagram of an information handling system 200 for providing diagnostics and remediation according to another embodiment of the present disclosure. System 200 includes a personal computer 201 and a remote remediation server 210. Personal computer 201 includes a disk drive 202, firmware 203, and a NIC 204. Disk drive 202 is configured to store an OS 205. System 200 also includes a remediation server 210, which includes a NIC 211. Personal computer 201 and remediation server 210 are configured to communicate over a network 220. In one embodiment, network 220 supports communication compliant with standard Internet protocols. In addition, network 220 can include a wired network, a wireless network, a local area network, a wide area network, a combination of such networks, and the like. For example, PC 201 can communicate with remediation server 210 over a Wi-Fi network provided by WLAN 150. In one embodiment, a wireless router or modem, not shown, can receive wireless communications from WLAN 150 and propagate the communications to remediation server 210. In still another embodiment, network 220 can include a cellular telecommunications network.

Techniques disclosed herein are described in the context of a personal computer soliciting support from a remediation server, for example, resources provided by a service provider, an original equipment manufacturer (OEM), and the like. One of skill will appreciate that these techniques are applicable to any situation where firmware at an information handling system solicits diagnostic and remediation services from a remote entity to address a boot failure.

During operation, firmware 203 is configured to manage initialization of personal computer 201. Under normal circumstances, the initialization culminates with passing control to an OS, such as a Windows operating system. The OS software can be stored on disk drive 202, or another type of storage medium, such as a solid state drive, a USB memory device, or the like. For the purpose of the present example, the OS is stored on disk drive 202, which is compliant with one or more formatting, partitioning, and file system standards, such as New Technology File System (NTFS), master boot record (MBR), GUID Partition Table (GPT), and the like. Disk drive 202 typically includes an indicator identifying the presence of a bootable partition included on the drive. During an early stage of device initialization, firmware 203 can identify disk drive 202, determine that the drive contains an OS, and determine that the drive is operating properly and can be accessed.

The OS and firmware are configured to monitor and report successful or unsuccessful launching of the OS. For example, the Windows operating system specification provides a Simple Boot Flag (SBF) register to allow the OS to notify firmware when a boot failure has occurred. During a subsequent boot attempt, the firmware can perform diagnostic routines to try to identify a reason for the previous boot failure. The SBF specification specifies that a BOOTING indicator is initially set by firmware 203, and is later reset by the OS to indicate the OS was successfully loaded. During a subsequent boot operation at PC 201, such as during a power-on self-test (POST), firmware 203 can access the SBF register. If the BOOTING indicator is still set, firmware 203 can determine that a prior attempt to load OS 205 was unsuccessful.

In one embodiment, one or more additional flags can be utilized to maintain a strike count, indicating a number of successive boot failures. For example, if a first boot operation failed due to a transient error, a subsequent attempt to boot OS 205 may be successful. Firmware 205 can include some diagnostic capabilities, but these capabilities may be limited, for example, by storage constraints of NVRAM 170. It is not atypical that a boot failure at a personal computer results in display of an error message informing a user of a problem. In many cases, a user of PC 201 will have little or no training to identify or correct the problem. Typically, the extent of a user's capability may include inserting an OS installation CD ROM, if available, and attempting to perform a repair operation provided by the OS installer. PC 201 may include resident diagnostic routines. For example, PC 201 may include an alternate OS, such as a service OS, which may be stored at disk drive 202 or at another data storage device. More often, remediation involves a service call, such as to the OEM, which can be inconvenient and costly. As disclosed herein, firmware 203 is configured to establish communication with remediation server 210 over network 220. In one embodiment, remediation server 210 can gain access to disk drive 202, remotely mount the drive, and diagnose the problem that is preventing successful booting of PC 201.

Figure 3:
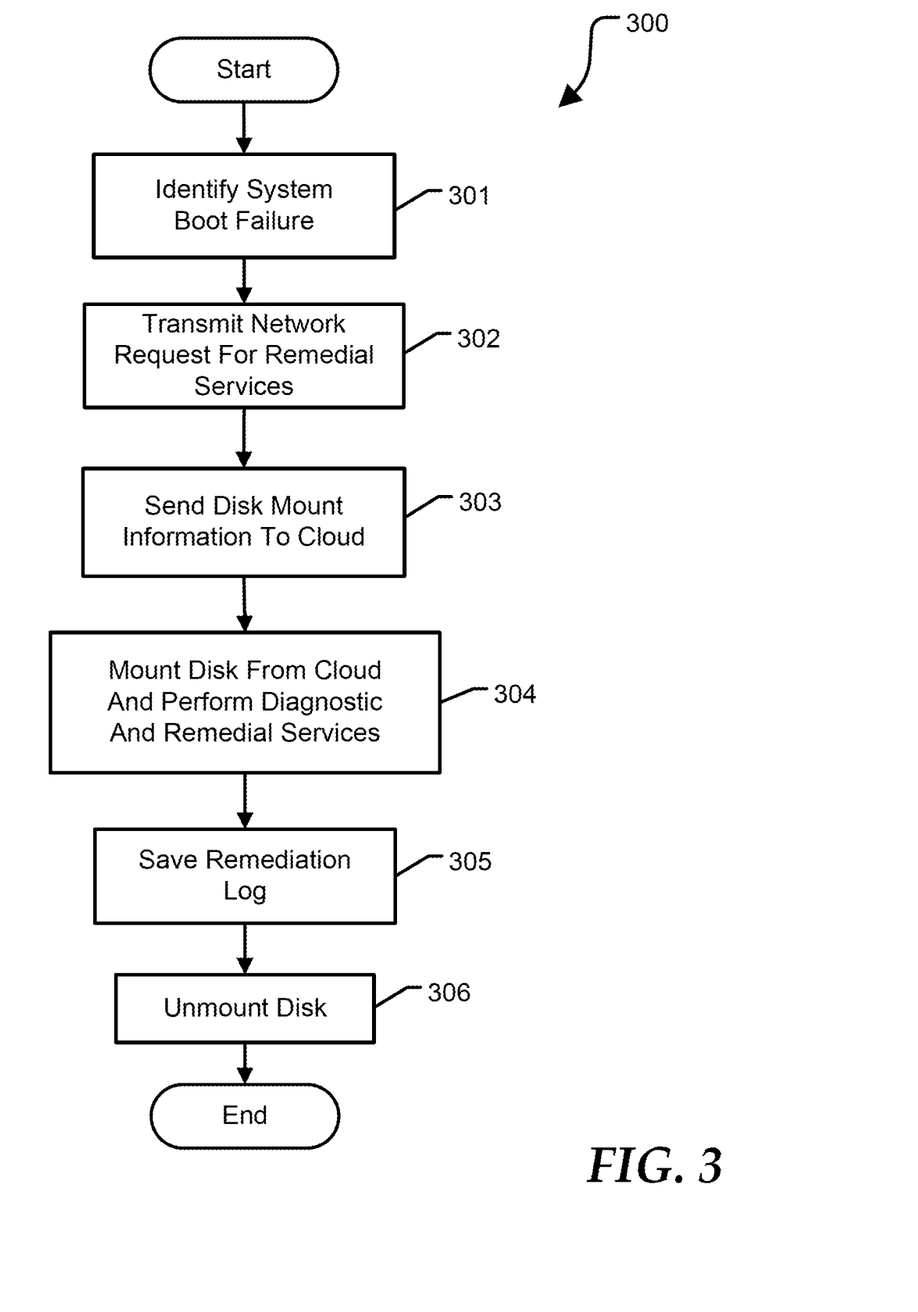
FIG. 3 is a flow diagram illustrating a method for performing remote remediation according to a specific embodiment of the present disclosure.

FIG. 3 is a flow diagram illustrating a method 300 for performing remote remediation according to a specific embodiment of the present disclosure. Method 300 begins at block 301 where an information handling system identifies that a boot failure as occurred. For example, firmware 203 at PC 201 can determine that a SBF is set, indicating that a previous OS boot operation was unsuccessful. Furthermore, firmware 203 can determine that disk drive 202 is accessible, at least from a low-level, hardware and electrical perspective. The method continues at block 302 where the information handling system issues a network request for remedial services. For example, firmware executing at PC 201 can send an Internet request to remote remediation server 210, requesting diagnostic services. While system 200 illustrates so-called cloud-based remediation server, one of skill will appreciate that remediation server 210 can be provided geographically close to PC 201. For example, remediation server 210 can be connected to PC 201 by a local area network (LAN). For another example, PC 201 can be a server at a data center and remediation server 210 can be local or remote to the data center, accessible over a LAN, by Internet, or via another standard or proprietary communications interface.

Method 300 continues at block 303 where the information handling system provides disk mount information to the remote remediation server. For example, remediation server 210 can utilize an Internet Small Computer System Interface (iSCSI) to communicate with PC 201. ISCSI is an Internet Protocol (IP)-based storage standard typically used for linking data storage facilities. The protocol allows clients, called initiators, to send SCSI commands to SCSI storage devices, referred to as targets. ISCSI allows two hosts to negotiate and then exchange SCSI commands using IP networks to create a storage area network (SAN). PC 201 can provide remediation server 210 with a logical unit number (LUN) identifying an individually addressable SCSI target device.

The method continues at block 304 where the remediation server, acting as an iSCSI initiator, remotely mounts the target data storage device and performs diagnostic and remedial services. For example, the iSCSI target, at PC 201, can export the disk, or a file on the disk, as an iSCSI block device. The iSCSI initiator can then mount the exported block device. Because disk drive 202 is mounted as a block base device, information at the drive can be accessed independent of various file system architectures present at the drive. For example, the boot failure may be caused by MBR corruption, and accessing data from drive 202 in block mode allows remediation server 210 to identify the corruption. Block mode refers to accessing information stored at a storage device in units of blocks, typically corresponding to one or more sectors. Block access does not rely on high level formatting at the storage device, such as a NTFS, to be functioning properly. As used herein, a data storage device accessed in block mode is referred to as a block device.

While the present example utilizes the iSCSI protocol to mount drive 202, one of skill will appreciate that other virtual disk remote mount technologies can be employed that allow remediation server 210 to remotely mount drive 202. Furthermore, one or more standard or proprietary messaging protocols can be used to facilitate communication between firmware applications at PC 201 and remediation server 210, such as the Extensible Messaging and Presence Protocol (XMPP), Message Queue Telemetry Transport (MQTT), Advanced Message Queuing Protocol (AMQP), and the like. Method 300 can be entirely automated, thus not requiring intervention by a user of PC 201 or a technician associated with remediation server 210.

Method 300 continues at block 305 where a remediation log can be stored at the client system, the remediation server, or both. For example, remediation server can diagnose the cause of the boot failure, remedy the situation, and generate a log file enumerating the actions that were performed. In one embodiment, the log file can be stored at NVRAM 170. In particular, NVRAM 170 can include a predefined region that is reserved for storing such information. Furthermore, information stored at the predefined region of NVRAM 170 can be made accessible to firmware 172 and to applications provided after an OS is successfully loaded. Method 300 proceeds to block 306 where the remediation server can un-mount the target storage device. Following completion of the diagnostic services, firmware at PC 201 can again attempt to boot the OS. If loading of the OS remains unsuccessful, method 300 can be repeated. If remote remediation fails to be successful, a service OS can be invoked to provide further automated online service and support.

Figure 4:
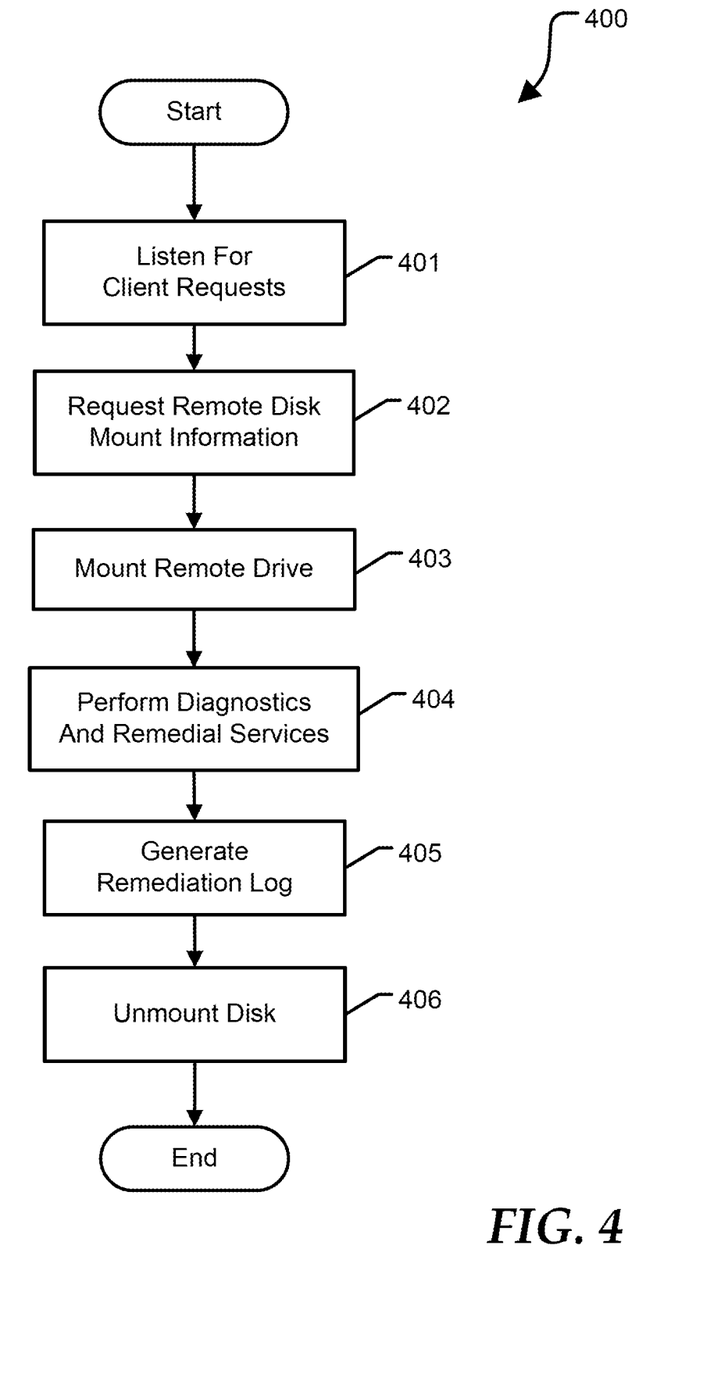
FIG. 4 is a flow diagram illustrating a method according to another embodiment of the present disclosure.

FIG. 4 is a flow diagram illustrating a method 400 according to another embodiment of the present disclosure. Method 400 is similar to method 300, but described from the point of view of the remediation server 210. The method begins at block 401 where a remediation server listens for client requests for support. For example, remediation server 210 can receive a request from firmware executing at PC 201, the request indicating that firmware has identified a boot failure that is preventing an OS from being loaded. The method proceeds to block 402 where the remediation server can request remote disk mount information, such as a LUN, as described above with reference to block 303 of FIG. 3. The method continues at block 403 where the remediation server mounts the remote drive. For example, remediation server can utilize an iSCSI protocol to virtually mount disk drive 202 at PC 201. The method continues at block 404 where the remediation server performs diagnostics and remedial services. For example, remediation server 210 can modify the configuration disk drive 202, edit a Windows registry, and the like. At block 405, the remediation server can generate a log documenting the diagnostic activity performed, and store the log at one or both of PC 201 and remediation server 210, or at another location. Method 400 terminates at block 406 where the remediation server unmounts the client's hard drive, thus completing the remote service call.

Figure 5:
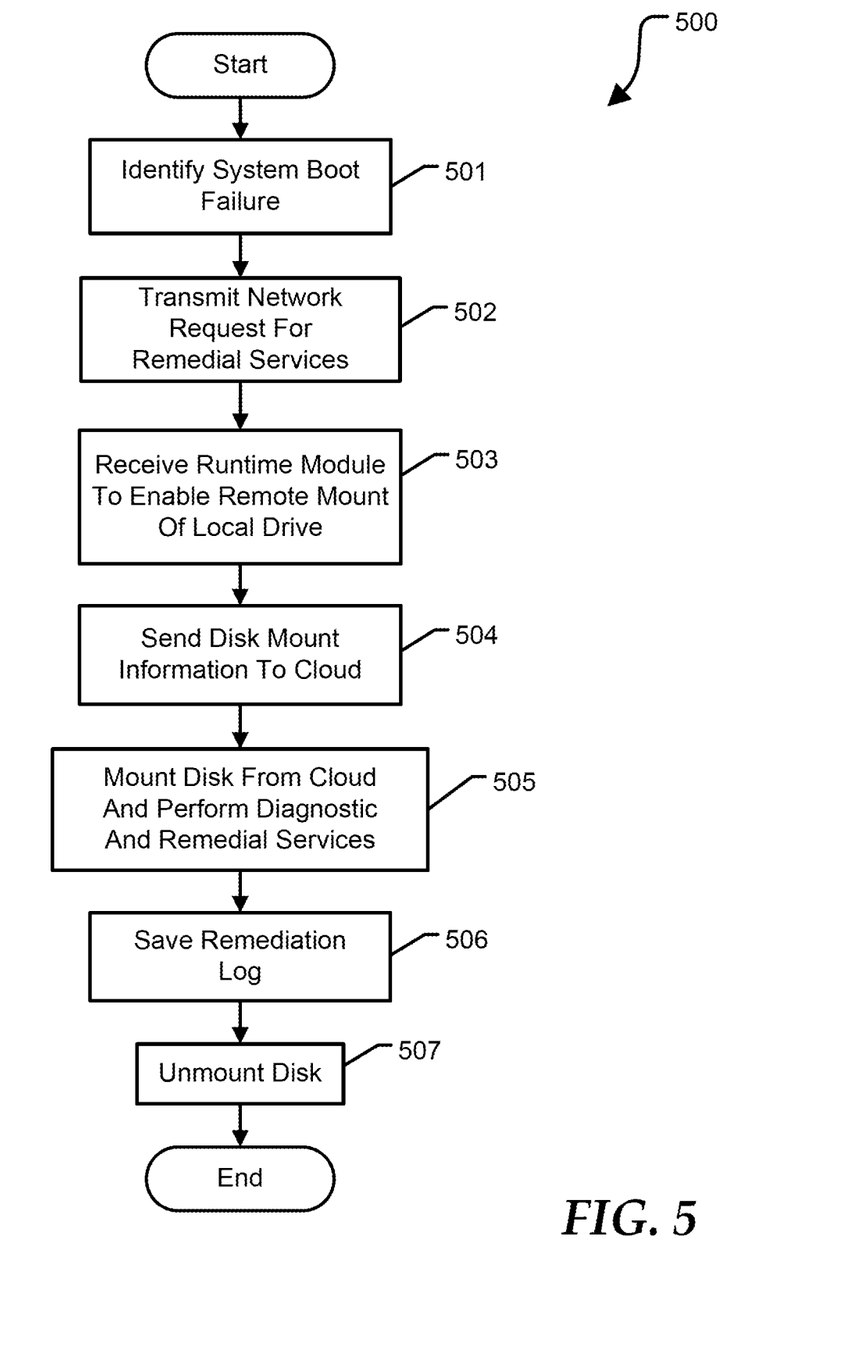
FIG. 5 is a flow diagram illustrating a method according to yet another embodiment of the present disclosure; and The use of the same reference symbols in different drawings indicates similar or identical items.

FIG. 5 is a flow diagram illustrating a method 500 according to yet another embodiment of the present disclosure. Method 500 is similar to method 300, but describes an alternative embodiment where firmware 203 does not include sufficient software resources necessary for remediation server 210 to mount drive 202 and perform diagnostic actions. For example, NVRAM 170 may be limited in storage capacity. Therefore, software, such as iSCSI and other communications and diagnostic tools must first be downloaded to PC 201. The method begins at block 501 where firmware at an information handling system determines that one or more boot failures as occurred. At block 502 firmware at the information handling system issues a request via the Internet or another network communication medium, the request directed to a remediation server. As described above, the remediation server can be provided at an OEM or another service provider that is tasked with providing support services to a client. A service that is provided remotely via the Internet is often referred to as a cloud service.

At block 503, the remediation server transmits a runtime module to the information handling system, the runtime module including software to facilitate remote mounting of the bootable storage device by the remediation server and for performing diagnostic tests. At block 504 the information handling system transmits disk mount information to the remediation server. At block 505, the remediation server mounts the client's disk drive and performs diagnostic and remediation services, as described above with reference to FIG. 3. Diagnostic tests can be performed locally at PC 201 under the direction of remediation server 210, by processes executing at remediation server 210, or at both locations. At block 506, a remediation log can be generated and stored at the client system, the remediation server, or both. At block 507 the remediation server unmounts the disk drive and the service call can be terminated.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving at a remediation server a service request from a data processing device located remotely from the remediation server, the service request to diagnose a failure to load an operating system at the data processing device;
identifying at the remediation server a data storage device local to the data processing device, the data storage device storing the operating system;
providing a diagnostic process at the remediation server, the diagnostic process to mount the data storage device;
generating at the remediation server a software module including instructions executable by the data processing device to enable the remediation server to remotely mount the data storage device;
providing the software module to the data processing device;
mounting the data storage device over an Internet protocol compliant network; and
performing a diagnostic service based on information stored at the data storage device.

2. The method of claim 1, wherein the service request is generated by firmware at the data processing device during initialization of the data processing device.

3. The method of claim 1, further comprising:
generating a first request at the remediation server, the first request soliciting mount information from the data processor device; and
receiving the mount information at the remediation server.

4. The method of claim 1, further comprising generating a report documenting a result of the diagnostic service.

5. The method of claim 1, further comprising mounting the data storage device using an Internet Small Computer System Interface.

6. The method of claim 1, wherein the operating system failed to load twice in successive attempts.

7. The method of claim 1, further comprising mounting the data storage device as a block device.

8. A system comprising:
a data processing device; and
a remediation server located remotely from the data processing device, the remediation server communicatively coupled to the data processing device by a network, the remediation server to:
receive a service request from the data processing device, the service request to diagnose a failure to load an operating system at the data processing device;
identify a data storage device local to the data processing device, the data storage device storing the operating system;
provide a diagnostic process at the remediation server, the diagnostic process to mount the data storage device;
generate a software module including instructions executable by the data processing device to enable the remediation server to remotely mount the data storage device;
provide the software module to the data processing device;
mount the data storage device over an Internet protocol compliant network; and
perform a diagnostic service based on information stored at the data storage device.

9. The system of claim 8, wherein the service request is generated by firmware at the data processing device during initialization of the data processing device.

10. The system of claim 8, wherein the remediation server is further to:
generate a first request soliciting mount information from the data processor device; and
receive the mount information from the data processing device.

11. The system of claim 8, further comprising mounting the data storage device as a block device.

12. A method comprising:
identifying at a data processing device a failure to load an operating system, the operating system stored at a data storage device included at the data processing device;
issuing a service request to a remediation server located remotely from the data processing device, the service request to determine a cause of the failure;
receiving from the remediation server a software module including instructions executable by the data processing device to enable the remediation server to remotely mount the data storage device;
receiving at the data processing device a request from the remediation server to remotely mount the data storage device to perform diagnostic services;
enabling at the data processing device mounting of the data storage device over an Internet protocol compliant network by the remediation server; and
receiving at the data processing device a diagnostic report from the remediation server documenting results of the diagnostic services.

13. The method of claim 12, wherein the service request is generated by firmware at the data processing device during initialization of the data processing device.

14. The method of claim 12, further comprising mounting the data storage device as a block device.

15. The method of claim 12, further comprising:
receiving a first request from the remediation server, the first request soliciting mount information from the data processor device; and
providing the mount information to the remediation server.

* * * * *